US012361406B2

(12) United States Patent
Hertzog et al.

(10) Patent No.: US 12,361,406 B2
(45) Date of Patent: *Jul. 15, 2025

(54) SMART CONTRACT OF A BLOCKCHAIN FOR MANAGEMENT OF CRYPTOCURRENCIES

(71) Applicant: Bprotocol Foundation, Zug (CH)

(72) Inventors: Eyal Hertzog, Ramat-HaSharon (IL); Yehuda Levi, Oporto (PT); Barak Manos, Kibbutz Yifat (IL); Asaf Shachaf, Herzliya (IL); Guy Ben Artzi, Rishpon (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/388,207

(22) Filed: Nov. 9, 2023

(65) Prior Publication Data

US 2024/0119444 A1  Apr. 11, 2024

Related U.S. Application Data

(63) Continuation of application No. 17/535,605, filed on Nov. 25, 2021, now Pat. No. 11,823,177, which is a
(Continued)

(51) Int. Cl.
*G06Q 20/36* (2012.01)
*G06F 16/23* (2019.01)
(Continued)

(52) U.S. Cl.
CPC ..... *G06Q 20/3672* (2013.01); *G06F 16/2379* (2019.01); *G06F 17/11* (2013.01);
(Continued)

(58) Field of Classification Search
CPC .......... G06Q 20/3672; G06Q 20/0655; G06Q 20/085; G06Q 20/3676; G06Q 20/3678;
(Continued)

(56) References Cited

U.S. PATENT DOCUMENTS 11,188,896 B1   11/2021 Hertzog et al.
2009/0119095 A1*  5/2009 Beggelman ............ G06F 40/30
                                                         704/9
(Continued)

FOREIGN PATENT DOCUMENTS

WO   WO 2018/127923   7/2018

OTHER PUBLICATIONS

Pernice et al. "Monetary Stabilization in Cryptocurrencies—Design Approaches and Open Questions", 2019 Crypto Valley Conference on Blockchain Technology, Jun. 20, 2019, pp. 47-59 (Year: 2019).*

(Continued)

*Primary Examiner* — James D Nigh

(57) ABSTRACT

There is provided a processor(s) executing a blockchain smart contract, for: managing a primary reserve of primary tokens and a secondary reserve of secondary tokens, receiving a transaction request, obtaining an external price of the primary token, compute an updated value of the primary reserve according to the external price, in response to the updated total value of primary reserve being unequal to an initial staked value of the primary reserve, adjust primary and secondary dynamic reserve weights, wherein a total value computed by a function of the primary reserve after being increased or decreased by a target amount of primary tokens and using the adjusted primary and secondary dynamic reserve weights, is equal to the initial staked value of the primary reserve, and the total value of the primary reserve is maintained at a predefined ratio to a total value of the secondary reserve, and executing the transaction request.

20 Claims, 4 Drawing Sheets

Related U.S. Application Data continuation of application No. 16/986,559, filed on Aug. 6, 2020, now Pat. No. 11,188,896, which is a continuation of application No. 16/907,486, filed on Jun. 22, 2020, now abandoned.

(51) Int. Cl.

| | | |
|---|---|---|
| *G06F 17/11* | (2006.01) | |
| *G06Q 10/10* | (2023.01) | |
| *G06Q 20/02* | (2012.01) | |
| *G06Q 20/06* | (2012.01) | |
| *G06Q 20/08* | (2012.01) | |
| *G06Q 20/38* | (2012.01) | |
| *G06Q 40/02* | (2023.01) | |
| *G06Q 40/04* | (2012.01) | |
| *H04L 9/00* | (2022.01) | |
| *H04L 9/06* | (2006.01) | |
| *H04L 9/32* | (2006.01) | |
| *H04L 9/40* | (2022.01) | |

(52) U.S. Cl.
CPC ......... *G06Q 10/10* (2013.01); *G06Q 20/0655* (2013.01); *G06Q 20/085* (2013.01); *G06Q 20/3676* (2013.01); *G06Q 20/3678* (2013.01); *G06Q 20/381* (2013.01); *G06Q 40/02* (2013.01); *G06Q 40/04* (2013.01); *H04L 9/0637* (2013.01); *H04L 9/3213* (2013.01); *G06Q 2220/00* (2013.01); *H04L 9/50* (2022.05); *H04L 2209/56* (2013.01)

(58) Field of Classification Search
CPC ...... G06Q 20/381; G06Q 20/02; G06Q 40/02; G06Q 40/04; G06Q 2220/00; G06Q 10/10; G06Q 2209/56; G06F 16/2379; G06F 17/11; H04L 9/0637; H04L 9/3213; H04L 9/50; H04L 9/3239; H04L 2209/56; H04L 63/12; H04L 2463/102
USPC ........................................................... 705/66
See application file for complete search history.

(56) References Cited

U.S. PATENT DOCUMENTS

| | | | | |
|---|---|---|---|---|
| 2017/0011460 | A1* | 1/2017 | Molinari | H04L 9/3247 |
| 2017/0330174 | A1* | 11/2017 | Demarinis | G06Q 40/04 |
| 2018/0331832 | A1* | 11/2018 | Pulsifer | H04L 9/3247 |
| 2020/0175506 | A1* | 6/2020 | Snow | G06Q 20/0655 |
| 2020/0380476 | A1* | 12/2020 | Trudeau | G06Q 20/0658 |
| 2021/0019737 | A1* | 1/2021 | Vladi | G06Q 20/02 |
| 2021/0065300 | A1* | 3/2021 | Leshner | H04L 9/0637 |
| 2021/0398105 | A1 | 12/2021 | Hertzog et al. | |
| 2021/0398106 | A1 | 12/2021 | Hertzog et al. | |
| 2022/0147975 | A1 | 5/2022 | Hertzog et al. | |

OTHER PUBLICATIONS

Notice of Allowance Dated Aug. 2, 2021 from the US Patent and Trademark Office Re. U.S. Appl. No. 16/986,559. (8 pages).
Notice of Allowance Dated Jul. 17, 2023 from the US Patent and Trademark Office Re. U.S. Appl. No. 17/535,605. (17 pages).
Official Action Dated May 6, 2021 from the US Patent and Trademark Office Re. U.S. Appl. No. 16/986,559. (14 pages).
Official Action Dated Nov. 23, 2022 from the US Patent and Trademark Office Re. U.S. Appl. No. 16/907,486. (31 pages).
Evans "Liquidity Provider Returns in Geometric Mean Markets", ArXiv Preprint ArXiv:2006.08806v1, p. 1-19, Jun. 15, 2020.
Pernice et al. "Monetary Stabilization in Cryptocurrencies—Design Approaches and Open Questions", Crypto Valley Conference on Blockchain Technology, IEEE, pp. 47-59, May 2019.

\* cited by examiner

US 12,361,406 B2

SMART CONTRACT OF A BLOCKCHAIN FOR MANAGEMENT OF CRYPTOCURRENCIES

RELATED APPLICATIONS

This application is a continuation of U.S. patent application Ser. No. 17/535,605 filed on Nov. 25, 2021, which is a continuation of U.S. patent application Ser. No. 16/986,559 filed on Aug. 6, 2020, now U.S. Pat. No. 11,188,896, which is a continuation of U.S. patent application Ser. No. 16/907,486 filed on Jun. 22, 2020. The contents of the above applications are all incorporated by reference as if fully set forth herein in their entirety.

FIELD AND BACKGROUND OF THE INVENTION

The present invention, in some embodiments thereof, relates to cybersecurity and, more specifically, but not exclusively, to systems and methods for cybersecurity for smart contracts of blockchain performing cryptocurrency.

Advances in blockchain technology provide distributed (i.e., non-centralized approaches) to enable almost any entity to create their own custom cryptocurrencies and/or create their own smart contract that provides cryptocurrency exchange services, thereby creating a target prone to cyber-attack and/or malicious activities. Cybersecurity approaches are being developed to protect such smart contracts from malicious activities and/or cyberattack.

SUMMARY OF THE INVENTION

According to a first aspect, a computing device for cybersecurity of a distributed smart contract executing on a blockchain, comprising: at least one hardware processor of a network connected server executing a code of the distributed smart contract of a distributed ledger dataset, the code for: managing a primary reserve of a plurality of primary tokens of a primary cryptocurrency and a secondary reserve of a plurality of secondary tokens of a secondary cryptocurrency, receiving a transaction request for the primary token, accessing a price oracle to obtain an external price of the primary token, computing an updated total value of the primary reserve according to the external price provide by the price oracle, in response to the updated total value of primary reserve computed based on the price oracle being unequal to an initial staked value of the primary reserve, adjust a primary dynamic reserve weight and adjust a secondary dynamic reserve weight, wherein a total value computed by a function of the primary reserve after being increased or decreased by a target amount of primary tokens and using the adjusted primary and secondary dynamic reserve weights, is equal to the initial staked value of the primary reserve, and the total value of the primary reserve is maintained at a predefined ratio to a total value of the secondary reserve, and executing the transaction request.

According to a second aspect, a method of cybersecurity of a distributed smart contract executing on a blockchain using at least one hardware processor of a network connected server executing a code of the distributed smart contract of a distributed ledger dataset, for: managing a primary reserve of a plurality of primary tokens of a primary cryptocurrency and a secondary reserve of a plurality of secondary tokens of a secondary cryptocurrency, receiving a transaction request for the primary token, accessing a price oracle to obtain an external price of the primary token, computing an updated total value of the primary reserve according to the external price provide by the price oracle, in response to the updated total value of primary reserve computed based on the price oracle being unequal to an initial staked value of the primary reserve, adjust a primary dynamic reserve weight and adjust a secondary dynamic reserve weight, wherein a total value computed by a function of the primary reserve after being increased or decreased by a target amount of primary tokens and using the adjusted primary and secondary dynamic reserve weights, is equal to the initial staked value of the primary reserve, and the total value of the primary reserve is maintained at a predefined ratio to a total value of the secondary reserve, and executing the transaction request.

According to a third aspect, a computer program product for cybersecurity of a distributed smart contract executing on a blockchain, comprises: a non-transitory memory storing thereon code for execution by at least one hardware process, the code including instructions for: managing a primary reserve of a plurality of primary tokens of a primary cryptocurrency and a secondary reserve of a plurality of secondary tokens of a secondary cryptocurrency, receiving a transaction request for the primary token, accessing a price oracle to obtain an external price of the primary token, computing an updated total value of the primary reserve according to the external price provide by the price oracle, in response to the updated total value of primary reserve computed based on the price oracle being unequal to an initial staked value of the primary reserve, adjust a primary dynamic reserve weight and adjust a secondary dynamic reserve weight, wherein a total value computed by a function of the primary reserve after being increased or decreased by a target amount of primary tokens and using the adjusted primary and secondary dynamic reserve weights, is equal to the initial staked value of the primary reserve, and the total value of the primary reserve is maintained at a predefined ratio to a total value of the secondary reserve, and executing the transaction request.

In a further implementation form of the first, second, and third aspects, a primary dynamic reserve weight is computed using the parameters of: a total amount of primary tokens in the primary reserve, a total amount of previously staked primary tokens in the primary reserve, a total amount of secondary tokens in the secondary reserve, the external price of the primary token, and an external price of the secondary token, wherein a secondary dynamic reserve weight is computed by subtracting the primary dynamic reserve weight from 1, wherein a current value of the respective primary and secondary token as offered by the smart contract is automatically computed by the function using the amount of the respective primary and secondary token in the respective primary and secondary reserve, amount of respective primary and secondary token in circulation, and the respective primary and secondary dynamic reserve weight.

In a further implementation form of the first, second, and third aspects, a current price of the primary token computed by the function using the adjusted weight and the primary reserve, prior to being increased or decreased by the target amount of primary token, is different than the external price of the primary token provided by the price oracle.

In a further implementation form of the first, second, and third aspects, after execution of another transaction request for the target amount of primary token corresponding to the increase or decrease of the primary token, a current price of the primary token computed by the function using the adjusted weight and the primary reserve after being increased or decreased by the target amount, is equal to the external price of the primary token provided by the price oracle.

In a further implementation form of the first, second, and third aspects, after execution of another transaction request for the target amount of primary token corresponding to the increase or decrease of the primary token, the total value of the primary reserve computed by the function using the adjusted weight and amount of the primary tokens stored in the primary reserve after being increased or decreased by the target amount, is equal to the initial staked value of the primary reserve.

In a further implementation form of the first, second, and third aspects, the target amount comprises the target amount of primary tokens that are converted into the secondary token such that the predefined ratio of the price of the primary token relative to the price of the secondary token computed by the function after the execution of the another transaction request, becomes equal to the ratio of the price of the primary token relative to the price of the secondary token obtained from the price oracle.

In a further implementation form of the first, second, and third aspects, further comprising: in response to the updated total value of the primary reserve computed based on the price oracle being equal to the initial staked value of the primary reserve, adjusting each respective dynamic reserve weight to respective adjusted weights, wherein a total value of the primary reserve computed by the function using the respective adjusted weights, is equal to the initial staked value of the primary reserve, and the total value of the primary reserve is maintained at a predefined ratio to a total value of the secondary reserve.

In a further implementation form of the first, second, and third aspects, the primary dynamic reserve weight and the secondary dynamic reserve weight are computed using a Lambert W function.

In a further implementation form of the first, second, and third aspects, the primary dynamic reserve weight of the primary token is denoted as $1/(1+x)$, and the secondary dynamic reserve weight of the secondary token is denoted as $x/(1+x)$, wherein:

$$x = \frac{T}{bp} \cdot \sum_{n=1}^{\infty} \frac{n^{n-1}}{n!} \cdot \left(\frac{T\log\left(\frac{T}{t}\right)}{bp}\right)^{n-1}$$

T=primary token reserve staked balance,
b=secondary token reserve current balance,
p=ratio of primary token/secondary token off-chain price as provided by the price oracle,
t=secondary token reserve current balance as computed by the function.

In a further implementation form of the first, second, and third aspects, further comprising virtually amplifying the amount of respective primary and secondary tokens in the reserves, wherein the function is computed using the virtually amplified amount.

In a further implementation form of the first, second, and third aspects, wherein the virtually amplified amount of each respective token is computed by multiplying the initial staked value of the respective token by an amplification value and subtracting therefrom, a difference between the initial staked value of the respective token and the current balance of the respective token in the reserves.

In a further implementation form of the first, second, and third aspects, wherein the transaction request comprises one of: converting the primary token into the secondary token, and converting the secondary token into the primary token, wherein the transaction request is executed after the adjustment of each respective dynamic weight to the adjusted weight.

In a further implementation form of the first, second, and third aspects, wherein the transaction request comprises adding a deposit amount of a certain token to the reserves, wherein the transaction request is executed prior to the accessing the price, computing to the updated value, and to the adjust each respective dynamic value, and further comprising code for minting an amount of a certain pool token corresponding to the deposit amount of the certain token, wherein the value of the deposit amount of the certain token is computed using the function prior to the execution of the transaction request, wherein the certain token is the primary token or the secondary token, and the certain pool token is a primary pool token corresponding to the primary token or a secondary pool token corresponding to the secondary token.

In a further implementation form of the first, second, and third aspects, the transaction requests comprises adding 100% of the deposit amount to the certain token, and wherein the amount of the certain pool token corresponds to 100% of the deposit amount of the certain token.

In a further implementation form of the first, second, and third aspects, the transaction request comprises adding a selected percentage deposit amount of a primary token and another selected percentage deposit amount of the secondary token to the reserves, wherein the transaction request is executed prior to the accessing the price, computing to the updated value, and to the adjust each respective dynamic value, and wherein minting comprising minting a primary amount of the primary pool token corresponding to the deposit amount of the primary token, and minting a secondary amount of the secondary pool token corresponding to the deposit amount of the secondary token, wherein the value of the primary and secondary deposit amounts is computed using the function prior to the execution of the transaction request.

In a further implementation form of the first, second, and third aspects, a value of the certain pool token is constant before and after the transaction request is executed, wherein a ratio between a total value of the total amount of certain pool tokens and the initial staked value of the certain token remains constant.

In a further implementation form of the first, second, and third aspects, further comprising code for: extracting a fee in response to executing a conversion of the certain token, adding the fee to the initial staked value of the certain token and/or the converted token, wherein the value of the certain pool token corresponding to the certain token is increased by the corresponding increase in the initial staked value of the certain token.

In a further implementation form of the first, second, and third aspects, extracting the fee comprises extracting a dynamic fee, wherein the dynamic fee is reduced relative to a baseline fee when the total value of the secondary reserve computed using an external price of the secondary token is greater than the initial staked value of the secondary reserve, and the dynamic fee is increased relative to the baseline fee when the total value of the secondary reserve is less than the initial staked value of the secondary reserve, wherein the fee added to the initial staked value is computed based on the baseline fee.

In a further implementation form of the first, second, and third aspects, extracting the fee comprises extracting a dynamic fee, wherein the dynamic fee is computed when the conversion is from a primary token to a secondary token, wherein the dynamic fee is computed as: dynamic fee=baseline fee*secondary ratio, secondary ratio=staked amount of secondary tokens in the secondary reserve/total amount of secondary tokens in the secondary reserve, wherein the fee added to the initial staked value is computed based on the baseline fee.

In a further implementation form of the first, second, and third aspects, the transaction request comprises receiving an amount of certain pool tokens for withdrawal, and further comprising: computing a withdrawal value of the certain token corresponding to the amount of certain pool tokens for withdrawal using the function prior to execution of the transaction request, destroying the amount of certain pool tokens for withdrawal, executing the transaction by removing the withdrawal value of the certain token from the reserves, wherein the transaction request is executed prior to the accessing the price, to computing the updated value, and to adjust each respective dynamic value.

In a further implementation form of the first, second, and third aspects, further comprising code for: detecting a failure of the price oracle in providing the external price of the primary token, wherein executing the transaction request comprises executing the transaction request using the function and dynamic reserve weights prior to the failure of the price oracle, detecting restoration of the price oracle in providing the external price of the primary token, and in response to the updated total value of primary token computed based on the restored price oracle and stored in the reserves being unequal to the initial staked value of the primary token, adjust each respective dynamic weight to an adjusted weight, wherein a total value computed by the function using the adjusted weight, of the primary tokens stored in the reserve after being increased or decreased by a target amount of primary tokens, is equal to the initial staked value.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
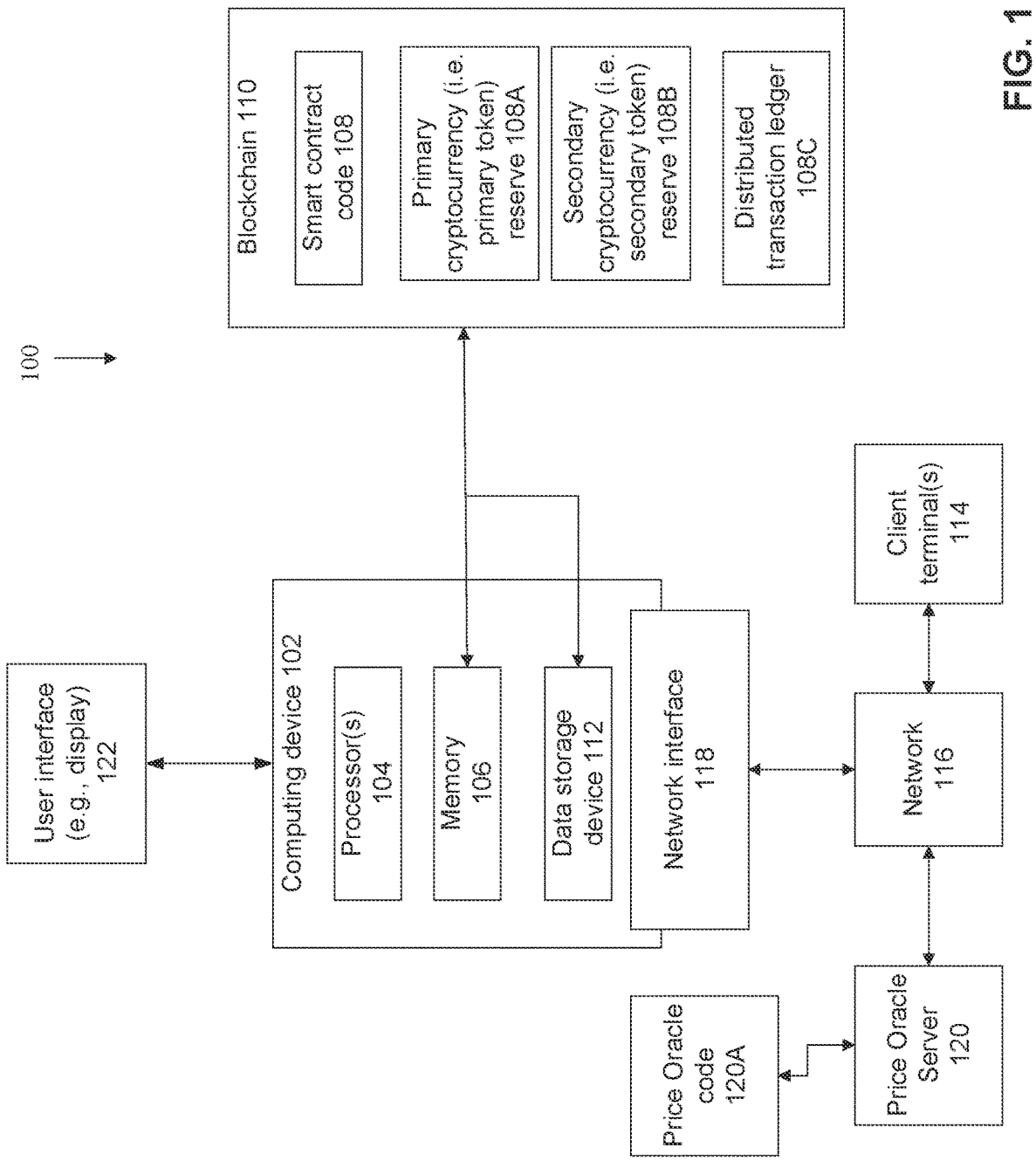
FIG. 1 is a block diagram of components of a system for executing transactions of cryptocurrencies based on dynamically adjusted dynamic reserve weights for providing cybersecurity of a smart contact, in accordance with some embodiments of the present invention.

The present invention, in some embodiments thereof, relates to blockchain based cryptocurrencies and, more specifically, but not exclusively, to systems and methods for distributed transactions of blockchain based cryptocurrencies.

As used herein, the term cryptocurrency and token are interchangeable. A token may be created for different purposes and/or uses, for example, representing money, club member points, frequent flyer points, reward points, as part of a game, and the like. Tokens may be customized cryptocurrencies issued and based upon another cryptocurrency such as provided by the Ethereum Network, Lisk, RootStock, and other Networks.

As used herein, the terms amount, value, and balance may sometimes be interchanged, for example, referring to the total amount and/or value and/or balance of a certain token reserve. The term amount may refer to the number of tokens.

As used herein, the term staked refers to the amount and/or value of tokens that is added to one or both of the reserves. The term initial staked refers to the initial amount and/or value of tokens provided to set-up the reserves. Additional amounts and/or value of tokens deposited to the existing reserves may also be referred to herein as staked, in contrast to the current value and/or amount of tokens that is already in the respective reserve(s). The term previously staked may refer to the total staked amount, including the initial staked amount and subsequent additional deposits. The current value and/or amount of tokens includes the initially staked amount, additional amounts deposited into the reserves (e.g., previously staked), and/or tokens that were added to the reserves as part of a cryptocurrency transaction between the two reserves.

It is noted that the terms primary and secondary used herein are arbitrarily, as any one of the two tokens and/or reserves and/or dynamic weights and/or pool tokens may be referred to as primary, with the other referred to as secondary. The terms primary and secondary are used for convention and clarity of explanation.

An aspect of some embodiments of the present invention relate to systems, methods, an apparatus, and/or code instructions (stored in a memory and executable by one or more hardware processors) for executing a smart contract of a blockchain that executes cryptocurrency transactions (e.g., deposit, withdrawal, conversion) using a primary reserve of primary tokens of a primary cryptocurrency and a secondary reserve of secondary tokens of a secondary cryptocurrency, based on dynamically computed adjustments to a primary dynamic reserve weight and/or a secondary dynamic reserve weight, optionally for providing cybersecurity for the smart contact and/or otherwise protecting token and/or cryptocurrency reserves from losses (e.g., which may occur during standard operation of the smart contact and/or due to malicious acts and/or cyberattacks). The primary dynamic reserve weight is computed using the following parameters: a total amount of primary tokens in the primary reserve, a total amount of primary tokens staked (e.g., initially staked) in the primary reserve, a total amount of secondary tokens in the secondary reserve, external (i.e., off-chain, not computed by the smart contract) price of the primary token (e.g., obtained from a price oracle), external (i.e., off-chain, not computed by the smart contract) price of the secondary token (e.g., obtained from a price oracle). The secondary dynamic reserve weight is computed using the value computed for the primary dynamic reserve weight, by subtracting the primary dynamic reserve weight from one (1). A current value of the respective primary and secondary token, as offered by the smart contract (which may be different than the corresponding external price) is automatically computed by a function of the amount of the respective primary and secondary token in the respective primary and secondary reserve, amount of respective primary and secondary token in circulation, and the respective primary and secondary dynamic reserve weight (which is dynamically adapted as described herein). When a transaction request for conversion of an amount of the primary token into the secondary token (or for conversion of the secondary token into the primary token) is received by the smart contract (e.g., from a client terminal), a price oracle (e.g., server) is accessed to obtain an external (optionally real time) price of the primary and/or secondary token. An updated total value of the primary reserve and/or secondary reserve is computed according to the corresponding external price. In response to the updated total value of primary reserve being unequal to an initial staked value of the primary reserve and/or the updated total value of the secondary reserve being unequal to an initial staked value of the secondary reserve, the primary dynamic reserve weight is adjusted to a primary adjusted dynamic reserve weight, and/or the secondary dynamic reserve weight is adjusted to a secondary adjusted dynamic reserve weight. The adjustment is performed to select the primary adjusted dynamic reserve weight and/or the secondary adjusted dynamic reserve weights that when used by the function to compute the price of the primary tokens stored in the primary reserve after the primary reserve is increased or decreased by a target amount of primary tokens, is equal to the initial staked value of the primary reserve, and so that the total value of the primary reserve is maintained at a predefined ratio to a total value of the secondary reserve computed using the function and the adjusted secondary dynamic reserve weight. The predefined ratio defining the total value between the primary reserve and secondary reserve may be initially fixed by the user that initially set-up the primary and secondary reserves, and provided the deposit to provide the primary and secondary reserves. As discussed herein, when the dynamic reserve weights are constant (as in standard approaches to converting cryptocurrencies), a user, which may be a malicious entity initiating a cyberattack, performing an arbitration transaction based on the price differences which may be part of the cyberattack, causes an impermanent loss, which may result in extraction of some value of cryptocurrency from the reserves managed by the smart contract. The primary and/or secondary dynamic reserve weights are adjusted in response to the primary and/or secondary token prices provided by the price oracle, reducing or eliminating the impermanent loss, providing cybersecurity against such malicious cyberattacks.

At least some implementations of the systems, methods, apparatus, and/or code instructions described herein improve the technology of providing cybersecurity for distributed (i.e., non-centralized) exchanges of cryptocurrencies, that use distributed ledgers. Smart contracts that provide distributed (i.e., non-centralized) exchanges of cryptocurrencies enable virtually any user to set up such an exchange, and/or to use such an exchange to trade virtually any cryptocurrency to any other cryptocurrency. Such smart contacts, which are distributed (i.e., non-centralized) may then become potential targets for cyberattack and/or malicious behavior by entities (e.g., human and/or bots), for example, that attempt to reduce value of cryptocurrencies from the reserves managed by the smart contracts by extraction of the value. It is noted that extraction of some value of the cryptocurrency reserves may occur during legitimate transactions, in which case at least some embodiments described herein may prevent or reduce such losses. The distributed ledger provides validity and trust that the transactions are immutable, transparent, and therefore trustworthy, even in the distributed environment. However, in an example, cyberattacks, malicious behavior which reduce cryptocurrencies from the reserves managed by the smart contact. Extraction of value from the token reserves may occur during legitimate transactions. Users may convert one cryptocurrency to another using smart contracts that manage pools of cryptocurrencies without resorting to finding another user to buy or sell the corresponding cryptocurrency, in contrast to standard exchanges of standard currencies (e.g., FIAT) that rely on performing exchanges directly between buyers and sellers using a function that computes the price of the cryptocurrencies independently of external market forces. In an example, entities may use standard and legitimate transactions to extract value from the cryptocurrency reserve(s). Users may convert cryptocurrencies with small number of tokens in circulation, and/or cryptocurrencies that are rarely traded (e.g., customized cryptocurrencies, reward points issued by a store), for which standard currency exchange processes are irrelevant, for example, for which the price cannot be properly determined due to lack of transactions and/or for which buyers and sellers cannot be matched. Providing cybersecurity to such low volume traded cryptocurrencies is a technical challenge, for example, in determining whether transactions in such low volume traded cryptocurrencies is a cyberattack or legitimate. Moreover, such distributed exchanges enable users to covert virtually any of the large number of cryptocurrencies that exist and that may be created in the future (e.g., thousands) quickly and efficiently, making it even more difficult to provide cybersecurity, for example, to distinguish legitimate transactions from cyberattack using transactions appearing to be legitimate, and/or to protect the token reserves from extraction of value therefrom using legitimate standard transactions. Thousands of cryptocurrencies cannot be traded using standard approaches since exchange rates between any two of the thousands of cryptocurrencies cannot be determined using standard approaches, in contrast to the limited number of FIAT currencies for which trades between any two currencies is easily determined, further making it difficult to provide cybersecurity, for example, to distinguish legitimate transactions from cyberattack using transactions appearing to be legitimate.

At least some implementations of the systems, methods, apparatus, and/or code instructions described herein address technical problems of providing cybersecurity to distributed (i.e., non-centralized) smart contracts executing on a blockchain that manage pools of cryptocurrencies that provide cryptocurrency conversion services, using distributed ledgers.

The technical problems are directly tied to, and arose from improvements in the technical field of cryptocurrencies, smart contracts, and distributed ledgers such a blockchain. For example, cyberattacks may be disguised as standard transactions in an effort to extract cryptocurrencies from reserves managed by the smart contract. Smart contract based cryptocurrency transactions are non-analogous to trade of real world currencies (FOREX exchanges) such as FIAT, and therefore, exchange of cryptocurrencies incurs unique cybersecurity technological problems that arise due to the new technological environment that has been created to support and exchange the cryptocurrencies, with no analogy to standard FIAT exchanges. For example, standard FIAT transactions do not result in extraction of value from FIAT reserves, but standard cryptocurrency transactions may result in extraction of value from cryptocurrency reserves. As such, the technical problems described herein and the solutions to the technical problems described herein have no counterparts prior to the development of such technologies. For example, standard conversion of FIAT currency is done by matching buyers and sellers. The price the buyers and sellers agree on is the market price, which is used for other currency transactions. Manipulation of exchange prices and/or manipulation of exchanges is difficult to perform for standard FIAT currency. The pricing and conversion processes of cryptocurrencies using distributed smart contracts managing pools of the cryptocurrencies is entirely different, which leads to technical problems and solutions that are entirely different, for example, cyberattack such as stealing of cryptocurrency funds from reserves managed by smart contracts by manipulation of cryptocurrency prices and/or transactions of cryptocurrencies.

One technical problem addressed by at least some implementations of the systems, methods, apparatus, and/or code instructions described herein relates to extraction of value from cryptocurrency reserves, sometimes referred to impermanent loss. Impermanent loss may occur during standard legitimate cryptocurrency transactions. Such legitimate cryptocurrency transactions may be initiated as a cyberattack in which a malicious entity (e.g., human and/or bot) designs such transactions to extract cryptocurrency funds from cryptocurrency reserves managed by a smart contract. Impermanent loss may be experienced by users that provide cryptocurrency in order to provide liquidity for smart contracts providing distributed cryptocurrency exchange services based on distributed ledgers such as blockchain. Impermanent loss is the difference between holding tokens in the smart contract and holding the tokens in a wallet. Such loss may occur since the smart contract providing token exchange services is disconnected from external market prices, with the price of the tokens being dynamically computed using mathematical functions based on a fixed defined weight ratio between the types of tokens stored by the smart contract, and the amount of tokens stored by the smart contact. When the price of the token computed by the smart contract deviates from a price available elsewhere, an arbitrage opportunity is created. The arbitrage opportunity may be created during a cyberattack, for example, when a malicious entity (e.g., human hacker, malicious code) manipulates the prices of the token (e.g., directly, by generation of specially designed transactions) to create the arbitrate opportunity. The malicious entity (or another arbitrageur user) may then buy the underpriced token or sell the overpriced token until prices offered by the smart contract match the price available elsewhere. The arbitrager effectively re-balances the distribution of types of tokens of the smart contract, to re-obtain the fixed defined weight ratio. During this transaction, which may be a form of cyberattack, the profit extracted by the arbitrageurs is effectively removed from the user that provided the liquidity, resulting in the impermanent loss, where cryptocurrency has been extracted from the reserves managed by the smart contract. It is noted that the impermanent loss, which is reduced and/or prevented by at least some embodiments, may be experienced by standard operation of the smart contract during cryptocurrency transactions, without necessarily occurring as part of a cyberattack. The inability to distinguish impermanent loss as a cyberattack rather than normal operations makes it difficult to detect such cyberattacks and/or to protect against such cyberattacks.

An example of an approach that uses the fixed defined weight ratio (i.e., fixed weight), also termed Reserve Ratio Constant, is described for example, with reference to "Methods for Exchanging and Evaluating Virtual Currency", Application No. IL2018/050023 (Publication No. WO2018/127932), filed on Jan. 8, 2018, which shares at least one inventor with the instant application, incorporated herein by reference in its entirety. Following is a formula for determining a price of a token being exchanged, using a fixed weight:

$$Tp = \frac{Tr}{Tt * Rr}$$

Wherein:
Tr denotes Total Reserve in underlying Tokens,
Tt denotes Total Tokens in circulation,
Rr denotes a Reserve Ratio Constant, which is the fixed weight described herein, and
Tp denotes the price of the Token in terms of an underlying Token.

At least some implementations of the systems, methods, apparatus, and/or code instructions described herein eliminate or reduce impermanent loss that may occur during cyberattacks and/or that may occur as part of standard non-attack transactions. The elimination or reduction of impermanent loss is obtained, in at least some embodiments, by the dynamic adjustment of the dynamic reserve weight when the value of the reserve tokens stored by the smart contact change (which were staked by a user providing liquidity at an initial staked value and amount. For example, a user may stake 100 token-A worth $100 and receive 50 token-A worth $50 at the end of the process). The reserve weight is defined per token type, and defines the relative proportion of the value of the respective token type. For example, when the reserve weight is 0.4 for the primary token, and 0.6 for the secondary token, the total value of the primary token held in reserve by the smart contact (i.e., value per token*number of primary tokens held in reserve) is 40% of the total value of tokens, while the total value of the secondary token held in reserve is 60%. The dynamic reserve weight is adjusted to dynamically indicate a balanced state, where the current value of the reserve tokens matches the value of the initially staked tokens. Since the balanced state is dynamically maintained, impermanent loss resulting from an unbalanced state is prevented or reduced. In contrast, other approaches that use a fixed value for the reserve weight "lock" the perceived value of each reserve token. The price per token is computed by such approaches by assuming that the total value of each reserve token is equal to the share of the pool based on the weight distribution, which results in impermanent loss, as described herein.

Another technical problem addressed by at least some implementations of the systems, methods, apparatus, and/or code instructions described herein relates to price slippage that may occur during cyberattacks and/or that may occur as part of standard non-attack transactions. Price slippage refers to the difference between the expected price before a transaction is executed and the actual price at which it is executed. Slippage occurs due to the dynamic variables of the function used to compute the price of the token. Every transaction changes the dynamic variables, which results in a slight change in price. The larger the transaction size of a token relative to its liquidity depth, the higher the price slippage. A substantial amount of liquidity is required to be staked in a pool in order to reduce the price slippage.

At least some implementations of the systems, methods, apparatus, and/or code instructions described herein reduce the amount of price slippage that would otherwise occur using standard approaches, by virtually amplifying the staked reserves for computing conversions. The virtual amplification allows more token conversions to occur on the pool and/or allows larger conversions to occur on the pool, due to the reduced price slippage. The increase in conversions and/or size of conversions increases the amount of collected fees for the user providing the liquidity to the pool.

Yet another technical problem addressed by at least some implementations of the systems, methods, apparatus, and/or code instructions described herein relates to funding and/or liquidity constraints that arise by requiring users that contribute liquidity to smart contacts providing token conversion services. In standard approaches, each pool of each smart contact includes at least 2 tokens. The user is required to provide funds to each type of token according to the fixed weight that defines the ratio between the types of tokens, for example, equal. The user is provided with a single type of pool token, which forces the user providing liquidity to add or remove liquidity to all reserve tokens at the fixed reserve weights. As such, the user holds both token types in a proportion defined by the fixed reserve weights (or is required to convert some of the deposited token type into the other token type according to the fixed reserve weight). The user can no longer maintain a long position on one of the token types. Moreover, if a user were to attempt to deposit (i.e., stake) one type of token into the reserve pool of the smart contract (or to deposit both types of tokens in a proportion that is different than the fixed reserve weights), the value of the reserve balance of the type of token would change since the values of the reserve weights are fixed. The change in the reserve balance would reduce the price of the primary type of tokens and/or create an arbitrage opportunity that would remove the increased value from the pool, resulting in an impermanent loss to the depositing user.

At least some implementations of the systems, methods, apparatus, and/or code instructions described herein enable users to provide liquidity with 100% exposure to one of the two types of tokens held in reserve by the smart contact, and/or to define the percent of exposure to each one of the two types of tokens held in reserve. The exposure to teach one of the two types of tokens is enabled by the minting of two types of pool tokens, corresponding to the two types of tokens held in reserve, and the dynamic computation of the dynamic reserve weights. The price of each type of pool token tracks the price of the corresponding staked type of pool token held in reserve by the smart contract. Moreover, by dynamically computing the dynamic reserve weight, the value of the reserve balance remains constant even when one type of token is deposited into the reserve and/or even when two types of tokens are deposited in any proportion. The maintenance of the value of the reserve balance by the dynamic reserved weights eliminates or reduces the risk of reduction in price of the reserve tokens and/or the arbitrate opportunity that causes impermanent loss.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
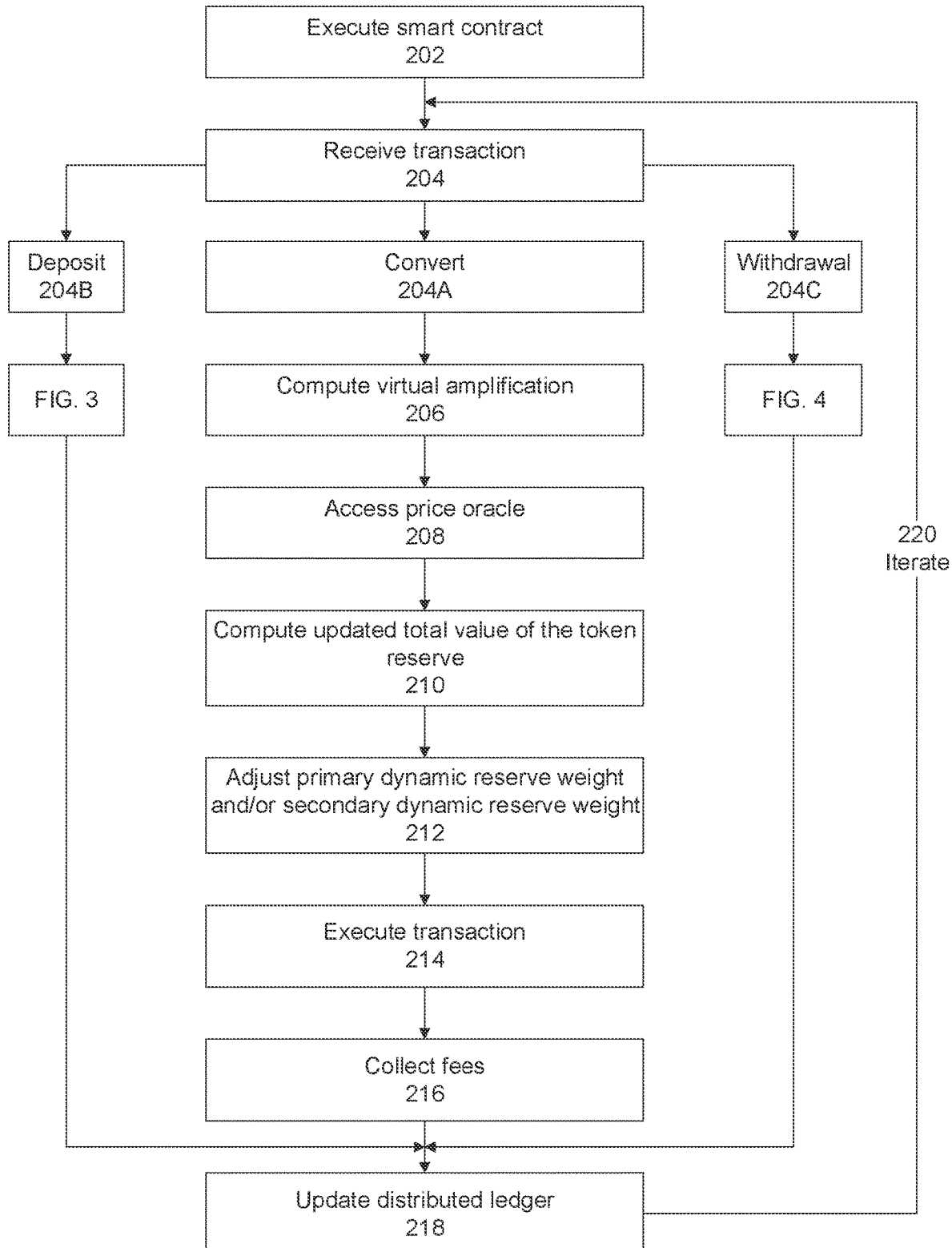
FIG. 2 is a flowchart of an exemplary process of executing transactions of cryptocurrencies based on dynamically adjusted dynamic reserve weights for providing cybersecurity of a smart contact, in accordance with some embodiments of the present invention.
Figure 3:
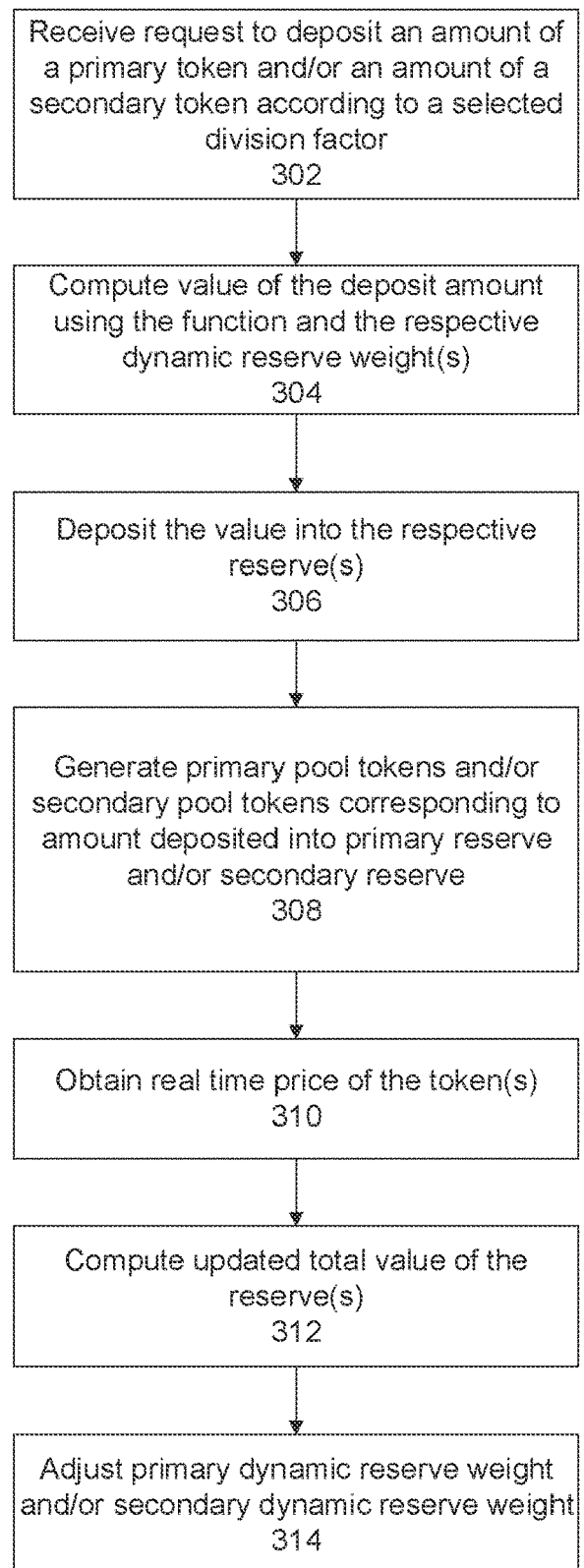
FIG. 3 is a flowchart of an exemplary process of depositing a selected percentage of a primary token and/or a selected percentage of a secondary token into the corresponding token reserve, in accordance with some embodiments of the present invention.
Figure 4:
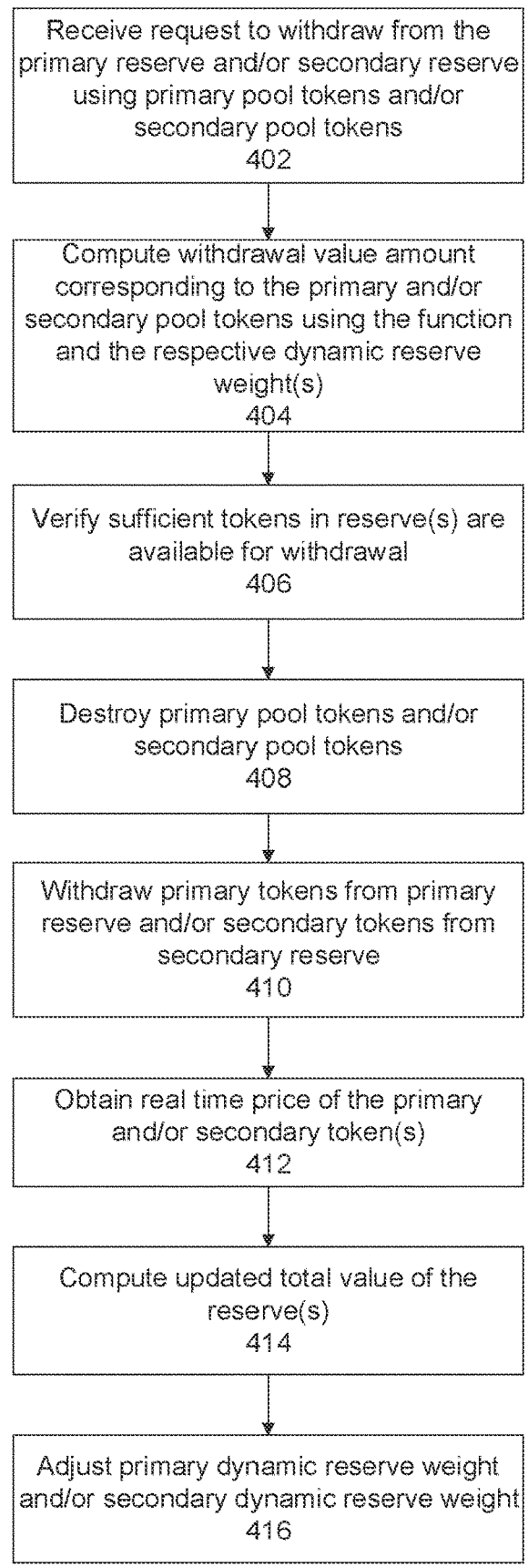
FIG. 4 is a flowchart of an exemplary process of withdrawing a selected amount of a primary token and/or a selected amount of a secondary token from the corresponding token reserve, in accordance with some embodiments of the present invention.

Reference is now made to FIG. 1, which is a block diagram of components of a system 100 for executing transactions of cryptocurrencies based on dynamically adjusted dynamic reserve weights for providing cybersecurity of a smart contact, in accordance with some embodiments of the present invention. Reference is also made to FIG. 2, which is a flowchart of an exemplary process of executing transactions of cryptocurrencies based on dynamically adjusted dynamic reserve weight for providing cybersecurity of a smart contract, in accordance with some embodiments of the present invention. Reference is also made to FIG. 3, which is a flowchart of an exemplary process of depositing a selected percentage of a primary token and/or a selected percentage of a secondary token into the corresponding token reserve, in accordance with some embodiments of the present invention. Reference is also made to FIG. 4, which is a flowchart of an exemplary process of withdrawing a selected amount of a primary token and/or a selected amount of a secondary token from the corresponding token reserve, in accordance with some embodiments of the present invention. System 100 may implement the methods described with reference to FIGS. 2-4.

System 100 includes multiple computing devices 102 each acting as a respective network node (one computing device 102 acting as one network node shown for clarity and simplicity). Computing devices 102 may be geographically distributed. Exemplary implementations of computing devices 102 include, for example, a server, a computing cloud, a virtual machine, a virtual server, a client terminal, a desk top computer, a kiosk, a mobile device, a Smartphone, a Tablet computer, a laptop computer, a wearable computer, augmented reality glasses, a glasses computer, and a watch computer.

Each computing devices 102 includes one or more hardware processors 104, for example, a central processing unit(s) (CPU), a graphics processing unit(s) (GPU), field programmable gate array(s) (FPGA), digital signal processor(s) (DSP), and application specific integrated circuit(s) (ASIC). Processor(s) 104 may include one or more processors (homogenous or heterogeneous), which may be arranged for parallel processing, as clusters and/or as one or more multi core processing units.

Each computing devices 102 includes a memory 106 that stores code instructions executable by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM).

Memory 106 stores smart contract code 108 (also referred to as distributed smart contract code) that executes on a blockchain 110.

Smart contact code 108 implements one or more features and/or acts of the method described with reference to FIGS. 2-4 when executed by hardware processor(s) 104. Smart contract code 108 manages a primary cryptocurrency (also referred to herein as a primary token) reserve 108A and a secondary cryptocurrency (also referred to herein as a secondary token) reserve 108B. Smart contact code 108 provides services for exchanging between the primary token and secondary token using reserves 108A-B, and/or for depositing additional primary and/or secondary tokens into reserves 108A and/or 108B, and/or for withdrawing tokens from reserves 108A and/or 108B, as described herein. Transactions executed by smart contract code 108 on reserves 108A and/or 108B are recorded in a distributed ledger 108C which may be stored on blockchain 110.

It is noted that different smart contracts 108 executing on the same computing device 102 and/or on different computing devices 102 may provide exchange services and/or deposit services and/or withdrawal services for different combinations of cryptocurrencies. Optionally, each smart contract 108 manages two reserves 108A-B that hold two types of cryptocurrencies, as set-up by a user acting as a liquidity provider. The user may select which two types of currencies will be stored in reserves 108A-B of the respective smart contract code 108.

Computing devices 102 includes a data storage device 112 for storing data. Data storage device 112 may be implemented as, for example, a memory, a local hard-drive, virtual storage, a removable storage unit, an optical disk, a storage device, and/or as a remote server and/or computing cloud (e.g., accessed using a network connection). It is noted that one or more of blockchain 110, smart contract code 108, reserves 108A and/or 108B, and ledger 108C, or portions thereof, may be stored in data storage device 112, and loaded from data storage device 112 into memory 106 for execution by processor(s) 104.

Computing devices 102 acting as network nodes communicate with each other for updating their respective copies of blockchain 110 and/or distributed transaction ledger 108C.

Each computing device 102 provides token exchanges services, and/or token deposit services, and/or token withdrawal services to multiple client terminals 114 over a network 116.

Computing device 102 may include a network interface 118, for example, a network interface card, a wireless interface to connect to a wireless network, a physical interface for connecting to a cable for network connectivity, a virtual interface implemented in software, network communication software providing higher layers of network connectivity, and/or combinations of the aforementioned.

Network 116 may be implemented as, for example, the internet, a local area network, a virtual network, a wireless network, a cellular network, a local bus, a point to point link (e.g., wired), and/or combinations of the aforementioned.

Client terminal 114 may be implemented as, for example, a server, a computing cloud, a virtual machine, a virtual server, a desktop computer, a kiosk, a mobile device, a Smartphone, a Tablet computer, a laptop computer, a wearable computer, augmented reality glasses, a glasses computer, and a watch computer.

Client terminal 114, may access smart contract code 108 and/or interact with smart contract code 108 for performing transactions (e.g., exchange, deposit, withdrawal), for example, by accessible software interfaces of the smart contract function code 108, for example, using a graphical user interface (GUI), application programming interface (API), software development kit (SDK), and/or transmission of messages specifying certain functions for execution. Smart contract code 108 may be accessed directly, and/or indirectly via another application that accesses smart contract code 108 to perform transactions, for example, a wallet managing application.

Smart contract code 108 receives data from price oracle code 120A (as described herein), which may be executed by a price oracle server 120 connected to network 116. Alternatively or additionally, price oracle code 120A is implemented within smart contract code 108.

Computing device 102 and/or client terminal(s) 114 include and/or are in communication with one or more physical user interfaces 122 that include a mechanism for a user to enter data (e.g., for performing a transaction with the primary and/or secondary tokens) and/or view data (e.g., view the results of the transaction). User interface 122 may present a GUI that includes the mechanism for entering data and/or viewing data. Exemplary user interfaces 122 include, for example, one or more of, a touchscreen, a display, gesture activation devices, a keyboard, a mouse, and voice activated software using speakers and microphone.

Referring now back to FIG. 2, at 202, a smart contract executed on a blockchain by a server connected to a network, where multiple client terminals access the smart contract for performing transactions using cryptocurrencies is provided.

The smart contract manages a primary reserve of a primary token of a primary cryptocurrency and a secondary reserve of a secondary token of a secondary cryptocurrency. Each reserve is set to respective initial staked value, according to the initial value provided by a user (e.g., liquidity provider).

A respective percentage of a total value of the primary token and the secondary tokens in the respective reserve is set according to a respective dynamic reserve weight (also referred to herein as dynamic weight). For example, when the dynamic reserve weight is 0.2, and 200 primary tokens are stored in the primary token reserve, the primary reserve value calculated as (200*primary reserve value)/0.2 in the pool is representing 20% of the total pool value.

A respective current value of the respective primary token and/or secondary token is automatically computed using a function of the respective amount of respective token in the reserves, amount of respective token in circulation, and the respective dynamic reserve weight. An exemplary function, for computing the price of the respective token (i.e., primary token, or secondary token) is denoted as:

$$Tp = \frac{Tr}{Tt * Rr}$$

Wherein:
Tr denotes the amount of respective (i.e., primary, secondary) tokens in the respective (i.e., primary, secondary) reserve,
Tt denotes the amount of respective tokens in circulation,
Rr denotes the dynamic reserve weight, and
Tp denotes the price of the respective (i.e., primary, secondary) token, optionally in terms of an underlying Token from which the respective token is derived from (e.g., Etherium).

It is noted that other functions based on the dynamic reserve weight may be implemented.

At 204, a transaction request is received for the primary token. For sake of simplicity and clarity of explanation, the term primary token is not necessarily referring to a particular token. The term primary token may sometimes refer to the primary token (e.g., denoted TKN) and may sometimes refer to the secondary token (e.g., denoted BNT).

Optionally, at 204A, the transaction request is for conversion of the primary token into the secondary token, or for converting the secondary token into the primary token. An exemplary process for conversion of tokens is described with reference to FIG. 2.

Alternatively, at 204B, the transaction request comprises adding a primary deposit amount of the primary token to the primary token reserve and/or adding a secondary deposit amount of the secondary token to the secondary token reserve. Details of an exemplary process for adding tokens to the reserve(s) are described with reference to FIG. 3.

Alternatively, at 204C, the transaction request comprises removing a primary withdrawal amount of the primary token from the primary token reserve and/or removing a secondary withdrawal amount of the secondary token from the secondary token reserve. Details of an exemplary process for withdrawing tokens from the reserve(s) is described with reference to FIG. 4.

At 206, the amount and/or total value of the primary token reserve and/or the amount and/or total value of the secondary token reserve may be virtually amplified. The virtual amplification may reduce conversion slippage, and/or increase overall fees collected from the transaction.

The virtually amplified amount may be used for computation of the conversion transaction, rather than the actual amount. The function for computing the price of the primary token and/or secondary token may be computed using the virtually amplified amount of the primary token reserve and/or the secondary token reserve.

The virtually amplified amount of the primary token reserve and/or the secondary token reserve may be computed by multiplying the initial staked value of the respective primary token and/or the secondary token by an amplification value, and subtracting therefrom, a difference between the initial staked value of the respective primary and/or secondary token and the current balance of the respective primary and/or secondary token in the reserves. For example, using the following exemplary equations:

$$PrimaryCurrentBalance\_Amp = PrimaryStakedBalance * Amp - (Primary StakedBalance - PrimaryCurrentBalance)$$

$$SecondaryCurrentBalance\_Amp = SecondaryStakedBalance * Amp - (SecondaryStakedBalance - SecondaryCurrentBalance)$$

where:
Amp denotes the amplification value,
PrimaryStakedBalance denotes the balance of Primary tokens initially staked in the primary token reserve,
PrimaryCurrentBalance denotes the current balance of Primary tokens in the primary token reserve,
PrimaryCurrentBalance_Amp denotes the result of the calculation and the balance used in the conversion calculation instead of PrimaryCurrentBalance,
SecondaryStakedBalance denotes the balance of Secondary tokens staked in the secondary token reserve,
SecondaryCurrentBalance denotes the current balance of Secondary tokens in the secondary token reserve, and
SecondaryCurrentBalance_Amp denotes the result of the calculation and the balance used in the conversion calculation instead of SecondaryCurrentBalance.

At 208, a price oracle is accessed to obtain an external (optionally real time) price of the primary token. The price oracle may be an external oracle (e.g., external smart contract that is updated by a server), and/or an internal oracle (e.g., within the smart contract code itself). In the case of the external oracle, an external server may update the current respective token price by writing to another smart contract that the smart contract may read from. The price oracle provides external (optionally real time) prices for tokens which are processed using transactions as described herein.

Optionally, a failure of the price oracle in providing the external price of the primary token is detected. For example, the price oracle is down and is not currently providing the external prices, and/or the prices obtained from the price oracle are incorrect (e.g., due to an exceptionally long delay such that the prices provided are old and not reflective of the external price). In response to detecting the failure of the price oracle, the transaction request (e.g., as described with reference to 214) is executed by computing the value of the primary token using the function and/or the dynamic reserve weights which were computed prior to the failure of the price oracle, for example, the function and/or the dynamic reserve weights which were updated after the last transaction. Effectively, the dynamic reserve weights temporarily become static reserve weights. Misbalances between the two token reserves may be re-balanced by arbitrageurs placing conversion transactions based on price differences between token prices computed by the function and prices of the tokens available from other sources. The conversions performed by the arbitrageurs help rebalance the two token reserves.

The price oracle may be monitored to detect restoration of the price oracle in providing the external price of the primary token.

When the price oracle is restored, the updated total value of primary token and/or updated total value of the secondary token may be computed based on the restored price oracle (e.g., as in 210). When updated total value of the primary and/or secondary token reserves is unequal to the initial staked value of the corresponding primary token and/or secondary token, each respective dynamic weight is adjusted to an adjusted weight (e.g., as in 212). The adjusted weight indicates a state of the primary and secondary token reserves that forces the total value of the primary and/or secondary tokens to return to the respective initial staked value, which brings the primary reserve pool and/or the secondary reserve pool to a desired state. The total value of the primary tokens stored in the reserve and/or the secondary tokens stored in the reserve, computed by the function using the adjusted dynamic weights after being increased or decreased by a target amount of primary and/or secondary tokens, is equal to the initial staked value.

At 210, an updated total value of the primary token reserve (also referred to as primary reserve balance) and/or an updated total value of the secondary token reserve (also referred to as secondary reserve balance) is computed according to the external price provided by the price oracle. For example, the external price of the primary token obtained from the price oracle is multiplied by the number of primary tokens in the reserve to obtain the updated total value of the primary token reserve, and/or the external price of the secondary token obtained from the price oracle is multiplied by the number of secondary tokens in the reserve to obtain the updated total value of the secondary token reserve.

At 212, the primary dynamic reserve weight is adjusted to a primary adjusted dynamic reserve weight, and/or the secondary dynamic reserve weight is adjusted to a secondary adjusted dynamic reserve weight. The dynamic reserve weights are adjusted in response to a price of the primary and/or secondary tokens as provided by the price oracle, that is different than the price of the primary and/or secondary tokens are computed by the function. As discussed herein, when the dynamic reserve weights are constant, a user performing an arbitration transaction causes an impermanent loss. The primary and/or secondary dynamic reserve weights are adjusted in response to the primary and/or secondary token prices provided by the price oracle, reducing or eliminating the impermanent loss. It is noted that the primary reserve and secondary reserve represent the external price ratio between the primary token and secondary token. After a conversion transaction is performed on the primary reserve and/or the secondary reserve, a predefined ratio between the total value of the primary reserve and the total value of the secondary reserve is lost, resulting in a state of imbalance. The balanced state, where the primary and secondary reserves back to the predefined ratio are restored is obtained by an arbitration opportunity created based on the price difference between the price of the primary and/or secondary tokens computed by the function using the dynamic reserve weights and the external price provided by the price oracle. The arbitration transaction, performed after a conversion transaction, restores the balanced state. When the arbitration transaction is performed after the conversion transaction and the external price of the token(s) has not changed, no impermanent loss occurs. When the arbitrage transaction is performed after the conversion transaction and the external price of the token(s) has changed, impermanent loss occurs. The impermanent loss may be reduced or eliminated by the adjustment of the dynamic reserve weight(s) which may maintain the balanced state, as described herein.

Optionally, the adjustment of the primary dynamic reserve weight and/or the secondary dynamic reserve weight is in response to the updated total value of primary reserve (computed based on the price oracle) being equal to the initial staked value of the primary reserve. The adjustment is performed to select the primary adjusted dynamic reserve weight and/or the secondary adjusted dynamic reserve weights that when used by the function to compute the price of the primary tokens stored in the primary reserve, a total value of the primary reserve is equal to the initial staked value of the primary reserve, and the total value of the primary reserve is maintained at a predefined ratio to a total value of the secondary reserve computed using the function and the adjusted secondary dynamic reserve weight.

The predefined ratio defining the total value between the primary reserve and secondary reserve may be initially fixed by the user that initially set-up the primary and secondary reserves, and provided the deposit to provide the primary and secondary reserves.

Alternatively, the adjustment of the primary dynamic reserve weight and/or the secondary dynamic reserve weight is in response to the updated total value of the primary reserve computed based on the price oracle being unequal to the initial staked value of the primary reserve. The adjustment is performed to select the primary adjusted dynamic reserve weight and/or the secondary adjusted dynamic reserve weights that when used by the function to compute the price of the primary tokens stored in the primary reserve after the primary reserve is increased or decreased by a target amount of primary tokens, is equal to the initial staked value of the primary reserve, and the total value of the primary reserve is maintained at a predefined ratio to a total value of the secondary reserve computed using the function and the adjusted secondary dynamic reserve weight. The target amount represents an arbitration amount (i.e., price difference between the price computed by the function and the external price provided by the oracle) to close the difference between the updated total value of the primary reserve computed based on the price oracle and the initial staked value of the primary reserve, and/or to close the difference between the updated total value of the primary reserve and the updated total value of the secondary reserve. For example, when the difference is 10 TKN (i.e., the primary reserve is missing 10 TKN), the adjusted dynamic reserve weights create an arbitration opportunity to add 10 TKN to the primary reserve. It is noted that the current price of the primary token computed by the function using the adjusted weight(s) and the primary reserve, prior to being increased or decreased by the target amount of primary token, is different than the external price of the primary token provided by the price oracle.

The target amount may be the target amount of primary tokens that are converted into the secondary token.

After execution of a subsequent transaction request for the target amount of primary token corresponding to the increase or decrease of the primary token, the current price of the primary token computed by the function using the adjusted dynamic reserve weight(s) and the primary reserve after being increased or decreased by the target amount, is equal to the external price of the primary token provided by the price oracle. Moreover, the total value of primary reserve computed by the function using the adjusted weight and the amount of primary tokens stored in the primary reserve after being increased or decreased by the target amount, is equal to the initial staked value of the primary reserve. Further, the predefined ratio of the price of the primary token relative to the price of the secondary token computed by the function after the execution of the subsequent transaction request, becomes equal to the ratio of the price of the primary token relative to the price of the secondary token obtained from the price oracle. For example, after the created arbitrage opportunity (to convert the target amount of tokens) is used by the arbitrate transaction (i.e., the subsequent transaction), the prices of the tokens computed using the function and the adjusted dynamic weights are equal to the external prices provided by the oracle, closing the arbitrage opportunity while restoring the balanced state.

Optionally, the primary and/or secondary dynamic reserve weights are computed using a Lambert W function.

Optionally, the primary dynamic reserve weight of the primary token is denoted as $1/(1+x)$, and the secondary dynamic reserve weight of the secondary token is denoted as $x/(1+x)$, wherein:

$$x = \frac{T}{bp} \cdot \sum_{n=1}^{\infty} \frac{n^{n-1}}{n!} \cdot \left(\frac{T\log\left(\frac{T}{t}\right)}{bp}\right)^{n-1}$$

T=primary token reserve staked balance,
b=secondary token reserve current balance,
p=ratio of primary token/secondary token off-chain price as provided by the price oracle,
t=secondary token reserve current balance as computed by the function.

Additional details describing the derivation of the above values for the dynamic reserve weights are now provided. Let:
BNT denote the primary token,
TKN denote the secondary token,
$w_1$ denote the BNT dynamic weight,
$w_2$ denote the TKN dynamic weight, b denote the BNT reserve current balance, t denote the TKN reserve current balance, T denote the initial staked TKN balance, p denotes the TKN/BNT off-chain price, obtained from the price oracle q denotes the TKN/BNT on-chain spot price, computed using the function with the current values of the respective dynamic weights, before being increased and/or decreased by a target amount (e.g., before an arbitrage conversion occurs), r denotes the TKN/BNT on-chain spot price, computed using the function with the current values of the respective dynamic weights, after being increased and/or decreased by a target amount (e.g., after the arbitrage conversion occurs).

when T≥t:

the target amount (e.g., arbitrage incentive) is for converting TKN to BNT, such that r will be equal to p. The conversion transaction (e.g., arbitrage conversion) will also impact t to become equal to T. In other words, the conversion (e.g., arbitrage conversion) is for an amount of TNK denoted by T−t, to be converted to BNT:

The result of converting T−t amount of TKN is $b(1-(t/T)^{w2/w1})$ amount of BNT.

The TKN reserve balance after the conversion (e.g., arbitrage conversion) occurs is T.

The BNT reserve balance after the conversion (e.g., arbitrage conversion) occurs is $b-b(1-(t/T)^{w2/w1})$.

The TKN/BNT on-chain spot price after the conversion (e.g., arbitrage conversion) occurs is $$\frac{Tw_1/w_2}{b-b\left(1-\left(\frac{t}{T}\right)^{w2/w1}\right)}.$$

When T and/or p change, $w_1$ and/or $w_2$ are recomputed such that the conversion transaction (e.g., arbitrage incentive) of making r equal to p will be equivalent to converting an amount of TKN denoted by T-t to BNT, which increases the TKN reserve balance (denoted t) to be equal to TKN initial staked balance (denoted T).

Let x denote w2/w1 in the section below:

$r = p \Longrightarrow$ $$\frac{T/x}{b-b\left(1-\left(\frac{t}{T}\right)^{w2/w1}\right)} = p \Longrightarrow$$

$$T = xbp\left(1-\left(1-\left(\frac{t}{T}\right)^{x}\right)\right) \Longrightarrow$$

$$T = xbp\left(\frac{t}{T}\right)^{x} \Longrightarrow$$

$$T^{x+1} = sbpt^{x} \Longrightarrow$$

$$x = \frac{W\left(\frac{T\log\left(\frac{t}{T}\right)}{bp}\right)}{\log\left(\frac{t}{T}\right)} = \frac{T}{bp} \cdot \sum_{n=1}^{\infty} \frac{n^{n-1}}{n!} \cdot \left(\frac{T\log\left(\frac{T}{t}\right)}{bp}\right)^{n-1}$$

Since $x = w_2/w_1$ and $w_2 = 1-w_1$: $w_1 = \frac{1}{1+x}$ and $$w_2 = \frac{x}{1+x}$$

At 214, the transaction request is executed. The transaction request is executed after the adjustment of each respective dynamic weight to the adjusted weight.

At 216, a fee in response to executing the conversion of the certain token is extracted. The fee may be defined by the creator of the token conversion service, which may be a single entity and/or created based on a vote submitted by multiple users.

The fee may be deducted from the converted tokens. Optionally, no fees are deducted from deposit transactions (e.g., as described with reference to FIG. 3) and/or from withdraw transactions (e.g., as described with reference to FIG. 4).

The fee may be added to the initial staked reserve value of the certain token corresponding to the exchanged token and/or the token being exchanged. The fee may be added by being deposited into the reserve of the respective token, as descried herein. The value of the pool token (which is provided to users that deposit tokens into the reserve, as described herein) corresponding to the reserve token to which the fee has been added, is increased by the corresponding increase in the initial staked value of the certain token. The price of the respective pool token appreciates by the deposit of the fee to the staked balance, which the amount (i.e., number) of the respective tokens in the respective reserve remains constant. The initial ratio (e.g., 1:1) between pool token and staked balances changes, causing the pool token to be worth more staked tokens.

Optionally, the fee is a dynamic fee that is dynamically computed, for example, for each transactions. The dynamic fee may be set to create a stronger incentive for the arbitrager and/or other user performing the transaction to bring the secondary staked balance to match the secondary current balance.

Optionally, the dynamic fee is reduced relative to a baseline fee (e.g., indicating a discounted fee) when the total value and/or amount of secondary tokens of the secondary reserve (e.g., computed using an external price of the secondary token) is greater than the initial staked value and/or amount of secondary tokens of the secondary reserve. The dynamic fee is increased (e.g., indicating a penalty) relative to the baseline fee when the total value of the secondary reserve is less than the initial staked value of the secondary reserve. The baseline fee may be the initially set value of the fee.

The dynamic fee may be computed using the following equations:

dynamic fee=baseline fee*secondary ratio, secondary ratio=staked amount of secondary tokens in the secondary reserve/total amount of secondary tokens in the secondary reserve, (e.g., amount indicates the number of tokens, for example 100 tokens rather than the corresponding monetary value of the 100 tokens).

Optionally, the dynamic fee is extracted when the conversion transaction is from the primary token to the secondary token. Optionally, the baseline fee, rather than the dynamic fee, is extracted when the conversion transaction is from the secondary token to the primary token.

Optionally, the dynamic fee is extracted, and the baseline fee is added to the secondary staked balance of the second reserve.

At 218, the distributed ledger is updated. For example, a new blockchain block is created with the details of the transaction, and distributed to other blockchain nodes for local updates of the blockchain.

At 220, one or more features described with reference to 204-218 are iterated. Optionally, a subsequent transaction is by a user (e.g., human, robot) acting as an arbitrageur, in response to the created arbitration opportunity. Alternatively, subsequent transactions are by users that want to perform transactions for other reasons.

Referring now back to FIG. 3, at 302, the transaction request to add a deposit amount of one or both of the tokens is received. The deposited amount is added to the respective reserve, The transaction request includes a division factor indicating how to divide the deposit amount into the two token reserves, for example, from an initial amount of $100, $70 is deposited into the primary token reserve and $30 is deposited into the secondary token reserve. In another example, the entire initial amount of $100 is deposited into the primary token reserve, and nothing is deposited into the secondary token reserve. A selected percentage deposit amount is added to the primary token reserve and/or another selected percentage deposit amount is added to the secondary token reserve.

The division factor is optionally selected by the user that provided the transaction request. The division factor may vary, for each of the tokens, from 0-100% of the respective token. The user may select the percentage for each token. The division factor is adjustable, optionally by the user, and not fixed as in standard approaches.

Optionally, the division factor is to deposit 100% of the deposit amount of one token. For example, to deposit 100% of the amount into the primary reserve of the primary token, or into the secondary reserve of the secondary token.

Alternatively, the division factor is to deposit the deposit amount into both token reserves at a defined percentage split, which may be 50/50, or other defined amount, for example, 90/10, 75/25, 30/70, and the like. It is noted that the deposit is not fixed to 50/50. The division factor may be defined by the user requesting the transaction.

At 304, the value of each of a primary deposit amount being deposited into the primary token reserve, and/or a secondary deposit amount being deposited into the secondary token reserve are computed using the function and the respective dynamic reserve weight.

The price of the primary pool token may be computed as: number and/or amount of primary pool tokens in circulation divided by the number and/or amount of staked primary token reserve. The price of the secondary pool token may be computed as: number and/or amount of secondary pool tokens in circulation divided by the number and/or amount staked secondary token reserve.

The value of the primary deposit amount and/or secondary deposit amount is computed prior to the execution of the transaction request in which the deposit is actually made (as described with reference to 306) and/or generation of the corresponding pool tokens (as described with reference to 308).

At 306, the deposit value of one or both tokens (as defined by the division factor) is added to the respective reserve. The deposited value increases the initial staked value of the primary and/or secondary token reserve, and the deposited value increases the value of the primary and/or secondary token reserve (i.e. the current balance in the respective token reserve).

At 308, an amount of a primary and/or secondary pool token corresponding to the value deposited into one or both token reserves is generated, for example, minted. A primary amount of the primary pool token corresponding to the deposit amount of the primary token is minted, and/or a secondary amount of the secondary pool token corresponding to the deposit amount of the secondary token is minted.

The number of primary pool tokens that is minted may be computed as: deposited amount of primary tokens*price of primary pool token. The number of secondary pool tokens that is minted may be computed as: deposited amount of secondary tokens*price of secondary pool token.

For the deposit amount added to the primary token reserve, an amount of a primary pool token that corresponds to the deposit amount is generated. The primary pool token may later be used to withdraw from the primary token reserve, i.e., to withdraw an amount from the primary token reserve that corresponds to the amount of the primary pool token. For the deposit amount added to the secondary token reserve, an amount of a secondary pool token that corresponds to the deposit amount is generated. The secondary pool token may later be used to withdraw from the secondary token reserve, i.e., to withdraw an amount from the secondary token reserve that corresponds to the amount of the secondary pool token.

Each of the primary and secondary tokens held in reserve by the smart contact has a certain ratio between the total staked amount of the respective token (e.g., the initial staked amount of the respective token that is deposited into the token reserve and/or additional staked amounts, also referred to herein as previously staked) and the total amount of respective pool tokens that are issued. The price of the respective pool token is determined according to the ratio for the respective pool token. When a deposit is made into one or both token reserves, the ratio is maintained, and the price of the pool token remains constant, before and after the deposit. The value (i.e., price) of each of the primary and secondary pool token remains constant, before the deposit transaction, and after the deposit transaction request is executed. The ratio between the total value of the total amount of primary pool tokens and the previous (e.g., initial) staked value of the primary token remains constant, and/or the ratio between the total value of the total amount of secondary pool tokens and the previously staked (e.g., initial) value of the secondary token remains constant.

It is noted that the transaction request, as described with reference to 306 and 308, is executed prior to the accessing the price oracle (as described with reference to 308), prior to computing to the updated total value (as described with reference to 312), and prior to the adjustment of each respective dynamic value (as described with reference to 314).

At 310, the external price of the primary and/or secondary token is obtained by accessing the price oracle, for example, as described with reference to 208 of FIG. 2

At 312, the updated total value of the primary token reserve and/or the secondary token reserve is computed according to the external price of the primary and/or secondary tokens, for example, as described with reference to 210 of FIG. 2.

At 314, the dynamic weight for the primary token and/or the dynamic weight for the secondary token are adjusted according to the external price of the primary token and/or the secondary token, for example, as described with reference to 212 of FIG. 2.

Referring now back to FIG. 4, at 402, the transaction request to withdraw an amount from one or both of the token reserves is received. The transactions request includes an amount of the primary pool token and/or the secondary pool token.

At 404, the value of each of a primary withdrawal value being withdrawn from the primary token reserve, and/or a secondary withdrawal value being withdrawn from the secondary token reserve are computed using the function and the respective dynamic reserve weight. The primary and/or secondary withdrawal value of the primary and/or secondary token correspond to the amount of the provided primary and/or secondary pool tokens.

At 406, primary withdrawal value and/or the secondary withdrawal value may be compared to the primary token reserve and/or to the secondary token reserve, to make sure that enough tokens are available. When the primary token reserve and/or the secondary token reserve do not include sufficient amount for withdrawal to provide the full amount corresponding to the primary and/or secondary pool tokens, the user may be provided with one or more options, for example, the respective value is provided to the user when other users add tokens to the reserve, the user may be provided the option to abort the transaction, and/or to be provided with the available amount, and/or to obtain the remaining amount by conversion from the other token reserve (when relevant).

The primary withdrawal value and/or the secondary withdrawal value are computed prior to the execution of the transaction request in which the withdrawal is actually made (as described with reference to 408) and/or destroying of the corresponding pool tokens (as described with reference to 410).

At 408, the primary and/or secondary pool tokens (provided for withdrawal of corresponding primary and/or secondary tokens) are destroyed.

At 410, an amount of primary tokens corresponding to the primary withdrawal value of the primary pool tokens is withdrawn from the primary reserve, and/or an amount of secondary tokens corresponding to the secondary withdrawal value of the secondary pool tokens is withdrawn from the secondary reserve. The withdrawn primary and/or secondary tokens may be provided to the user, for example, deposited into a digital wallet of the user.

The withdrawn value decreases the initial staked value of the primary and/or secondary token reserve, and the withdrawn value decreases the value of the primary and/or secondary token reserve (i.e. the current balance in the respective token reserve).

Each of the primary and secondary tokens held in reserve by the smart contact has a certain ratio between the total staked amount of the respective token (e.g., the initial staked amount of the respective token that is deposited into the token reserve and/or additional staked amounts, also referred to herein as previously staked) and the total amount of respective pool tokens that are issued. The price of the respective pool token is determined according to the ratio for the respective pool token. When a withdrawal from one or both token reserves is made, the ratio is maintained, and the price of the pool token remains constant, before and after the withdrawal. The value (i.e., price) of each of the primary and secondary pool token remains constant, before the withdrawal transaction, and after the withdrawal transaction request is executed. The ratio between the total value of the total amount of primary pool tokens and the previously (e.g., initial) staked value of the primary token remains constant, and/or the ratio between the total value of the total amount of secondary pool tokens and the previously (e.g., initial) staked value of the secondary token remains constant.

It is noted that the transaction request, as described with reference to 408 and 410, is executed prior to the accessing the price oracle (as described with reference to 412), prior to computing to the updated total value (as described with reference to 414), and prior to the adjustment of each respective dynamic value (as described with reference to 416).

At 412, the external price of the primary and/or secondary token is obtained by accessing the price oracle, for example, as described with reference to 208 of FIG. 2.

At 414, the updated total value of the primary token reserve and/or the secondary token reserve is computed according to the external price of the primary and/or secondary tokens, for example, as described with reference to 210 of FIG. 2.

At 416, the dynamic weight for the primary token and/or the dynamic weight for the secondary token are adjusted according to the external price of the primary token and/or the secondary token, for example, as described with reference to 212 of FIG. 2.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant cryptocurrencies will be developed and the scope of the term cryptocurrency is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a secondary indicate number and "ranging/ranges from" a first indicate number "to" a secondary indicate number are used herein interchangeably and are meant to include the first and secondary indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computing device for cybersecurity of a distributed smart contract executing on a blockchain, comprising:
   at least one processor of a network connected server executing a code of the distributed smart contract, the code for:
   establishing communication with a price oracle hosted by a server for obtaining in real time, an external price of a primary token of a primary cryptocurrency to a primary reserve managed by the at least one processor;
   computing an updated total value of the primary reserve according to the external price; and
   in response to the updated total value of the primary reserve being unequal to an initial staked value, adjusting a primary dynamic reserve weight and adjusting a secondary dynamic reserve weight for maintaining the updated total value of the primary reserve and secondary reserve at a predefined ratio.

2. The computing device of claim 1, wherein maintaining the updated total value of the primary reserve and secondary reserve at a predefined ratio comprises a total value computed by a function of the primary reserve after being increased or decreased by a target amount of primary tokens and using the adjusted primary and secondary dynamic reserve weights, is equal to the initial staked value of the primary reserve, and the total value of the primary reserve is maintained at the predefined ratio to a total value of a secondary reserve of a plurality of secondary tokens of a secondary cryptocurrency.

3. The computing device of claim 1, further comprising code for:
   receiving a transaction request for adding a primary deposit amount of the primary token;
   computing a primary deposit value of the primary deposit amount according to the function and the primary dynamic reserve weight;
   adding the primary deposit value to the primary reserve; and
   minting an amount of a primary pool token corresponding to the primary deposit value, wherein the receiving the transaction request, the computing the primary deposit, the adding, and the minting, are performed prior to the computing the updated total value and prior to the adjust.

4. The computing device of claim 3, wherein a value of the primary pool token is constant before and after adding the deposit value and the minting, wherein a ratio between a total value of a total amount of the primary pool token and the initial staked value of the primary reserve remains constant.

5. The computing device of claim 3,
   wherein the transaction request is further for adding a secondary deposit amount of the secondary token of the secondary cryptocurrency to the secondary reserve;
   computing a secondary deposit value of the secondary deposit amount according to the function and the secondary dynamic reserve weight;
   adding the secondary deposit value to the secondary reserve;
   minting an amount of a secondary pool token corresponding to the secondary deposit value
   wherein the value of the primary and secondary deposit amounts is computed using the function prior to the execution of the transaction request.

6. The computing device of claim 3, wherein after execution of another transaction request for the target amount of primary token corresponding to the increase or decrease of the primary token, a current price of the primary token computed by the function using the adjusted weight and the primary reserve after being increased or decreased by the target amount, is equal to the external price of the primary token provided by the price oracle.

7. The computing device of claim 3, wherein after execution of another transaction request for the target amount of primary token corresponding to the increase or decrease of the primary token, the total value of the primary reserve computed by the function using the adjusted weight and amount of the primary tokens stored in the primary reserve after being increased or decreased by the target amount, is equal to the initial staked value of the primary reserve.

8. The computing device of claim 7, wherein the target amount comprises the target amount of primary tokens that are converted into the secondary token such that the predefined ratio of the price of the primary token relative to the price of the secondary token computed by the function after the execution of the another transaction request, becomes equal to the ratio of the price of the primary token relative to the price of the secondary token obtained from the price oracle.

9. The computing device of claim 3, further comprising code for:
in response to detecting a failure of the price oracle in providing the external price of the primary token, executing the adding and the minting using the function and dynamic reserve weights prior to the failure of the price oracle; and
in response to detecting restoration of the price oracle in providing the external price of the primary token, wherein the updated total value of primary token computed based on the restored price oracle and stored in the reserves being unequal to the initial staked value of the primary token, adjust each respective dynamic weight to an adjusted weight, wherein a total value computed by the function using the adjusted weight, of the primary tokens stored in the reserve after being increased or decreased by a target amount of primary tokens, is equal to the initial staked value.

10. The computing device of claim 1, wherein the primary dynamic reserve weight is computed using the parameters of: a total amount of primary tokens in the primary reserve, a total amount of previously staked primary tokens in the primary reserve, a total amount of secondary tokens in the secondary reserve, the external price of the primary token, and an external price of the secondary token, wherein a secondary dynamic reserve weight is computed by subtracting the primary dynamic reserve weight from 1, wherein a current value of the respective primary and secondary token as offered by the smart contract is automatically computed by the function using the amount of the respective primary and secondary token in the respective primary and secondary reserve, amount of respective primary and secondary token in circulation, and the respective primary and secondary dynamic reserve weight.

11. The computing device of claim 1, wherein a current price of the primary token computed by the function using the adjusted weight and the primary reserve, prior to being increased or decreased by the target amount of primary token, is different than the external price of the primary token provided by the price oracle.

12. The computing device of claim 1, further comprising code for:
in response to the updated total value of the primary reserve computed based on the price oracle being equal to the initial staked value of the primary reserve, adjusting each respective dynamic reserve weight to respective adjusted weights, wherein a total value of the primary reserve computed by the function using the respective adjusted weights, is equal to the initial staked value of the primary reserve, and the total value of the primary reserve is maintained at a predefined ratio to a total value of the secondary reserve.

13. The computing device of claim 1, wherein the primary dynamic reserve weight and the secondary dynamic reserve weight are computed using a Lambert W function.

14. The computing device of claim 1, further comprising code for:
virtually amplifying the amount of respective primary and secondary tokens in the reserves, wherein the function is computed using the virtually amplified amount by multiplying the initial staked value of the respective token by an amplification value and subtracting therefrom, a difference between the initial staked value of the respective token and the current balance of the respective token in the reserves.

15. The computing device of claim 1, further comprising code for:
extracting a fee in response to executing a conversion of the primary token,
adding the fee to the initial staked value of the primary token,
wherein the value of the primary pool token corresponding to the primary token is increased by the corresponding increase in the initial staked value of the certain token.

16. The computing device of claim 15, wherein extracting the fee comprises extracting a dynamic fee, wherein the dynamic fee is reduced relative to a baseline fee when the total value of the secondary reserve computed using an external price of the secondary token is greater than the initial staked value of the secondary reserve, and the dynamic fee is increased relative to the baseline fee when the total value of the secondary reserve is less than the initial staked value of the secondary reserve, wherein the fee added to the initial staked value is computed based on the baseline fee.

17. The computing device of claim 15, wherein extracting the fee comprises extracting a dynamic fee, wherein the dynamic fee is computed when the conversion is from a primary token to a secondary token, wherein the dynamic fee is computed as:

dynamic fee=baseline fee*secondary ratio, secondary ratio=staked amount of secondary tokens in the secondary reserve/total amount of secondary tokens in the secondary reserve, wherein the fee added to the initial staked value is computed based on the baseline fee.

18. The computing device of claim 1, further comprising code for:
receiving an amount of the primary pool token for withdrawal as the primary token;
computing a withdrawal value of the primary token corresponding to the amount of the primary pool tokens for withdrawal using the function;
destroying the amount of certain pool tokens for withdrawal; and
removing the withdrawal value of the primary token from the primary reserve, wherein a destroying the amount and the removing the withdrawal value are executed prior to the obtaining the price, to computing the updated value, and to adjust each respective dynamic value.

19. A method of cybersecurity of a distributed smart contract executing on a blockchain using at least one hardware processor of a network connected server executing a code of the distributed smart contract of a distributed ledger dataset, for:
establishing communication with a price oracle hosted by a server for obtaining in real time, an external price of a primary token of a primary cryptocurrency to a primary reserve managed by the at least one processor;
computing an updated total value of the primary reserve according to the external price; and
in response to the updated total value of the primary reserve being unequal to an initial staked value, adjusting a primary dynamic reserve weight and adjusting a secondary dynamic reserve weight for maintaining the updated total value of the primary reserve and secondary reserve at a predefined ratio.

20. A computer program product for cybersecurity of a distributed smart contract executing on a blockchain, comprising:
- a non-transitory memory storing thereon code for execution by at least one hardware process, the code including instructions for:
- establishing communication with a price oracle hosted by a server for obtaining in real time, an external price of a primary token of a primary cryptocurrency to a primary reserve managed by the at least one processor;
- computing an updated total value of the primary reserve according to the external price; and
- in response to the updated total value of the primary reserve being unequal to an initial staked value, adjusting a primary dynamic reserve weight and adjusting a secondary dynamic reserve weight for maintaining the updated total value of the primary reserve and secondary reserve at a predefined ratio.

* * * * *